US007086529B2

(12) United States Patent
Yoneyama et al.

(10) Patent No.: US 7,086,529 B2
(45) Date of Patent: Aug. 8, 2006

(54) PACKAGING MATERIAL FOR PHOTOGRAPHIC LIGHT-SENSITIVE MATERIAL AND PHOTOGRAPHIC LIGHT-SENSITIVE MATERIAL PACKAGE USING SAME

(75) Inventors: Takashi Yoneyama, Kanagawa (JP); Kenji Sashihara, Kanagawa (JP); Takanori Masuda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 236 days.

(21) Appl. No.: 10/372,802

(22) Filed: Feb. 26, 2003

(65) Prior Publication Data

US 2003/0162137 A1 Aug. 28, 2003

(30) Foreign Application Priority Data

Feb. 26, 2002 (JP) ...................................... 2002-049927

(51) Int. Cl.

*G03C 3/02* (2006.01)
*G03C 3/00* (2006.01)
*B65D 85/48* (2006.01)
*B32B 27/32* (2006.01)
*B32B 27/30* (2006.01)

(52) U.S. Cl. ................. 206/455; 206/524.4; 206/524.6; 428/521; 428/522; 428/523; 524/190; 524/202; 524/204; 524/403; 524/408; 524/413; 524/228; 430/496; 430/501

(58) Field of Classification Search ................. 524/190, 524/202, 204, 228, 403, 408, 413; 206/455, 206/524.4, 524.6; 428/521, 522, 523
See application file for complete search history.

(56) References Cited

U.S. PATENT DOCUMENTS 4,454,270 A * 6/1984 Kolodchin et al. ......... 524/102
5,543,270 A * 8/1996 Akao et al. ................. 430/501
5,827,584 A * 10/1998 Akao et al. ................. 430/501

FOREIGN PATENT DOCUMENTS

EP 583 778 * 2/1994
JP 6-67356 A 3/1994
JP 8-41288 A 2/1996
JP 2000-147716 A 5/2000

* cited by examiner

*Primary Examiner*—Richard L. Schilling
(74) *Attorney, Agent, or Firm*—Birch, Stewart, Kolasch & Birch, LLP.

(57) ABSTRACT

There is provided a packaging material for a photographic light-sensitive material, the packaging material being formed from a resin composition that contains a compound having an unsaturated double bond or that contains a poly (conjugated diene) component, a metal ion that can promote a catalytic oxidation reaction of the unsaturated double bond and the poly(conjugated diene), and a chelating agent that can coordinate the metal ion in an amount sufficient to suppress the catalytic oxidation reaction. There is also provided a photographic light-sensitive material package formed by housing the photographic light-sensitive material in the packaging material for the photographic light-sensitive material.

21 Claims, No Drawings

PACKAGING MATERIAL FOR PHOTOGRAPHIC LIGHT-SENSITIVE MATERIAL AND PHOTOGRAPHIC LIGHT-SENSITIVE MATERIAL PACKAGE USING SAME

This nonprovisional application claims priority under 35 U.S.C. § 119(a) on Patent Application No. 2002-049927 filed in JAPAN on Feb. 26, 2002, which is herein incorporated by reference.

BACKGROUND OF THE INVENTION

1. Field of the Invention

The present invention relates to a packaging material for a photographic light-sensitive material, the packaging material comprising a resin composition that contains a compound having an unsaturated double bond or a resin composition that contains polybutadiene; and a photographic light-sensitive material package.

2. Description of the Related Art

With regard to a packaging material for a photographic light-sensitive material, in the case of, for example, a general-purpose polystyrene resin, its function is strengthened by blending or copolymerizing a polybutadiene rubber component for maintaining the impact strength. In general, high molecular weight chains that constitute synthetic resin moldings are decomposed by light, heat, moisture, oxygen in air, etc. and their physical properties are degraded. The function of the packaging material for a photographic light-sensitive material is therefore maintained by adding an antioxidant, etc.

On the other hand, since the packaging material for a photographic light-sensitive material is used as a packaging material for housing the photographic light-sensitive material to give a photographic light-sensitive material package, it is necessary for the packaging material not to generate harmful materials that adversely affect the photographic light-sensitive material. Therefore, in order to suppress the generation of harmful materials that adversely affect the photographic properties of the photographic light-sensitive material, the development of various resin materials has been carried out (ref. JP-A-6-67356 (JP-A denotes a Japanese unexamined patent application publication), JP-A-2000-147716, and JP-A-8-41288).

However, it is difficult to identify the causes when attempting to control effectively the influence of a resin composition containing polybutadiene on the photographic properties. In the case of a polybutadiene-containing resin, for example, a high impact polystyrene (HIPS) resin, an antioxidant is added in order to prevent degradation of the physical properties of the resin and the photographic properties of the photographic light-sensitive material, but the effect is not satisfactory.

BRIEF SUMMARY OF THE INVENTION

It is therefore an object of the present invention to provide a packaging material for a photographic light-sensitive material and a package housing the photographic light-sensitive material in the above packaging material, the packaging material having excellent impact resistance and rigidity and comprising a resin composition that contains a compound having an unsaturated double bond or that contains a poly(conjugated diene) component such as polybutadiene, and the photographic properties of the photographic light-sensitive material not being degraded even when it is stored together with the packaging material at a high ambient temperature for a long period of time.

The above-mentioned object has been attained by the following means.

1) A packaging material for a photographic light-sensitive material, the packaging material comprising a resin composition that contains a compound having an unsaturated double bond or that contains a poly(conjugated diene) component, a metal ion that can promote a catalytic oxidation reaction of the unsaturated double bond or the poly(conjugated diene), and a chelating agent that can coordinate the metal ion, the chelating agent being present in an amount sufficient to suppress the catalytic oxidation reaction, 2) the packaging material for a photographic light-sensitive material according to 1) wherein ½ to 3 equivalents of the chelating agent for the metal ion is added relative to the amount of metal ion that is contained in the resin composition that contains the free metal ion that can promote the catalytic oxidation reaction, and 3) a photographic light-sensitive material package formed by housing a photographic light-sensitive material in the packaging material for a photographic light-sensitive material according to 1) or 2).

DETAILED DESCRIPTION OF THE INVENTION

The present invention is now explained in detail.

With regard to resins used in the resin composition that contains a compound having an unsaturated double bond, thermoplastic resins, thermosetting resins, etc. can be cited. More specifically, a polyolefin is preferable, and low density polyethylene, polystyrene, etc. are more preferable.

The compound having an unsaturated double bond used in the present invention is preferably an unsaturated organic acid, an unsaturated aliphatic compound, an unsaturated alcohol, or a derivative thereof (an amide, an ester, an ether). The amount of the compound having an unsaturated double bond used is 10 to 0.05 wt % relative to the resin, and preferably 5 to 0.1 wt %.

The resin that contains a poly(conjugated diene) component used in the present invention is a resin formed by copolymerizing an aliphatic conjugated diene monomer and a monomer that can copolymerize therewith. The aliphatic conjugated diene monomer is not particularly limited, and examples thereof include 1,3-butadiene, isoprene, 2,3-dimethyl-1,3-butadiene, 2-ethyl-1,3-butadiene, 1,3-pentadiene, and chloroprene. They can be used singly or in a combination of two or more types. Among these aliphatic conjugated diene monomers, 1,3-butadiene is preferable.

The amount of the aliphatic conjugated diene monomer used is 0.5 to 60 wt % of the entire monomers, and preferably 1 to 50 wt %.

The monomer that can copolymerize with the aliphatic conjugated diene monomer includes an ethylenically unsaturated monomer such as an aromatic vinyl monomer, an ethylenically unsaturated nitrile monomer, and a (meth) acrylate ester monomer.

The aromatic vinyl monomer is not particularly limited, and examples thereof include styrene, methylstyrene, vinyltoluene, chlorostyrene, and hydroxymethylstyrene. They can be used singly or in a combination of two or more types. Among these aromatic vinyl monomers, styrene is preferable.

Examples of the ethylenically unsaturated nitrile monomer include acrylonitrile and methacrylonitrile, and acrylonitrile is preferable.

Examples of the (meth)acrylate ester monomer include methyl (meth)acrylate, ethyl (meth)acrylate, propyl (meth) acrylate, butyl (meth)acrylate, 2-ethylhexyl (meth)acrylate, dibutyl maleate, dibutyl fumarate, diethyl maleate, methoxymethyl (meth)acrylate, ethoxyethyl (meth)acrylate, methoxyethoxyethyl (meth) acryl ate, cyanomethyl (meth) acryl ate, 2-cyanoethyl (meth)acrylate, and hydroxyethyl acrylate.

The amount of the monomer that can copolymerize with the aliphatic conjugated diene monomer is 99.5 to 40 wt % of the entire monomers, and preferably 99 to 50 wt %.

Specific examples of the resin that contains a poly (conjugated diene) component used in the present invention are listed below.

A/B/A resin: acrylonitrile/butadiene/acrylate ester
ABS resin: acrylonitrile/butadiene/styrene
MBS resin: methacrylate/butadiene/styrene
S/B resin: styrene/butadiene
HIPS: high impact polystyrene resin (polystyrene containing about 3 wt % of butadiene)

In the above-mentioned specific examples, the proportion at which the polybutadiene is copolymerized is preferably, for example, 3 to 5 wt % for HIPS and 20 to 30 wt % for ABS.

The polybutadiene component of the resin can also be a mixture with another thermoplastic resin instead of being copolymerized. In the case of the mixture, the amount of poly(aliphatic conjugated diene) blended is preferably 0.5 to 50 wt %.

Examples of the metal that can promote the catalytic oxidation reaction of the resin composition that contains the compound having an unsaturated double bond and the catalytic oxidation reaction of the poly(conjugated diene) component include metal ions, metals and metal oxides of Co, Cu, Fe, V, Cd, Al, Mg, Ni, Ti, Ca, Zn, Ag, Ga, Ge, As, Se, Mn, Cr, Sc, In, Sn, Sb, Te, etc. Co, Cu and Fe exhibit a particularly large effect in promoting the catalytic oxidation reaction.

An adverse influence due to the promotion effect is observed in many cases at 5 ppm or more, although it depends on the type of metal.

In the present invention, the chelating agent is added in an amount such that the adverse influence of free metal on the photographic properties can be suppressed. It is conceivable that this amount corresponds to an amount sufficient to suppress the catalytic oxidation reaction. The metal chelating agent added can be chosen appropriately from known chelating agents according to the type of metal. Representative examples of the chelating agent include dithizone, sodium diethyldithiocarbamate, and N,N-diphenyloxamide. Deterioration of the photographic properties due to the adverse influence of metallic impurities can be prevented by adding the chelating agent at ½ to 3 equivalents relative to the free metal ion, etc., and preferably 1 to 2 equivalents, that is, an amount sufficient to coordinate the free metal ion. The equivalents referred to in the present invention means the number of moles of chelating agent that chelate with 1 atom of the metal ion. For example, when 2 moles of chelating agent react with 1 mole of metal ion, the amount of the chelating agent relative to the metal ion is defined as 2 equivalents.

As an organic pigment, an azo pigment or a phthalocyanine type pigment can be added to the packaging material for a photographic light-sensitive material of the present invention. A phthalocyanine pigment is a fast pigment having a blue or green hue. As an example of the phthalocyanine pigment, copper phthalocyanine (Pig. Blue 15; C.I. No. 74160) can be cited, and this pigment is a metal complex salt pigment in which phthalocyanine coordinates divalent copper (II) ion as a chelating agent. Therefore, metal complex salt pigments such as copper phthalocyanine do not correspond to the 'chelating agent' referred to in the present invention. On the other hand, metal-free phthalocyanine (Pigment Blue 16, C.I. No. 74100) does correspond to the chelating agent of the present invention. Since free copper ions, etc. present as impurities in the copper phthalocyanine pigment promote the catalytic oxidation reaction of the resin composition that contains the compound having an unsaturated double bond and the resin that contains the poly (conjugated diene) component, in order to mask the metal ions present as impurities, a chelating agent (ligand) having a large stability constant can be added according to the present invention, thereby producing a packaging material for a photographic light-sensitive material that can prevent degradation of the photographic properties.

As a result of our investigation, it has been found that degradation of the photographic properties of a light-sensitive material is greatly affected by a metal present in the resin. For example, when coloring an HIPS resin, which contains polybutadiene, a copper phthalocyanine pigment is added and kneaded, and at this point if free copper is present as an impurity the polybutadiene molecular chains are broken by decomposition as a result of the catalytic action of the copper metal, thus generating an organic acid such as formic acid or acetic acid; an aldehyde such as formaldehyde, acetaldehyde, or acrolein; furthermore, hydrogen gas, etc., and trace amounts of such decomposition products can greatly degrade the photographic properties of the light-sensitive material. With regard to the free metals, in addition to copper, for example, Co, Fe, V, Ga, Ge, As, Mn, Cr, Sc, In, Sn, Sb, and Te, oxides thereof, and chlorides thereof can also degrade the photographic properties.

This phenomenon almost never occurs for a polystyrene resin containing no polybutadiene (GPPS), and there is no affect on the photographic properties.

The packaging material of the present invention can be used together with light-sensitive materials of various types to give a light-sensitive material package. The packaging material of the present invention is preferably used together with photographic light-sensitive materials of various types to give a photographic light-sensitive material package. With regard to the photographic light-sensitive materials, in addition to a black and white light-sensitive material and a color light-sensitive material employing a light-sensitive silver halide, a heat-developable light-sensitive material employing silver behenate, etc. can be widely applied.

The packaging material of the present invention can also be used, for example, as a cushioning material for winding a wide roll of light-sensitive printing material, as a pack for an instant color unit, and as a container for 135 size color negative film.

Specific examples of the packaging material of the present invention include a container for a photographic light-sensitive material and its associated member, in particular, a light-shielding container for a photographic light-sensitive material and its constituent member (a moisture-proof container for a 135 format film cartridge (including a lid), a 135 format spool, a magazine for an APS format film, an instant film pack, a 110 format film cartridge, a rectangular parallelepiped magazine housing a light-sensitive printing material, a tube for winding a long length of light-sensitive material, a flange for winding a long length of light-sensitive material and holding it from opposite sides thereof, a cushioning material placed in a container for a light-sensitive material, a supporting board for a stack of light-sensitive material (a package in contact with the stack of light-sensitive material, or a part of the package), etc.), and a container for a film-with-lens (registered trademark 'Utsurundesu').

The packaging material of the present invention can be produced directly by injection molding. Alternatively, the resin composition that contains the compound having an unsaturated double bond and the resin composition that contains the poly(conjugated diene) component are molded into sheet form, and this is laminated as necessary with a member having an adhesive layer to give a final packaging material.

Since the resin packaging material for a photographic light-sensitive material of the present invention can suppress the generation of gases such as aldehydes, formic acid, and hydrogen that are harmful to the photographic light-sensitive material, the photographic light-sensitive material can be stored in a container formed from the packaging material for a long period of time without degrading the photographic fogging properties of the photographic light-sensitive material.

EXAMPLES

The present invention is explained below by means of specific examples and comparative examples, but the present invention is not limited by the examples shown below.

Example 1

Sample 1 To 100 parts by weight of high impact polystyrene (HIPS) comprising 97 parts by weight of general-purpose polystyrene (GPPS) and 3 parts by weight of low-cis polybutadiene were added 1.5 parts by weight of silicone oil, 0.2 parts by weight of titanium oxide, and 0.05 parts by weight of calcium stearate. The mixture to which the additives had been added was then melt-kneaded at a resin temperature of 230° C. using a single shaft extruder whose extrusion screw had an L/D of 25. The resin thus kneaded was extruded into water in the form of a strand, solidified, and then cut into resin pellets having a diameter of 3 mm and a length of 3 mm by means of a pelletizer.

Samples 2 to 11 The procedure for Sample 1 was repeated except that the additives shown in Table 1 were added to give Samples 2 to 11, and moldings were produced as described below and evaluated.

Two moles of dithizone (chelating agent 1) coordinate with one atom of copper to form a completely coordinated metal complex. Two moles of sodium diethyldithiocarbamate (chelating agent 2) also coordinate with one atom of copper to form a completely chelated compound.

Two moles of dithizone (chelating agent 1) coordinate with one atom of iron to form a completely coordinated chelate compound. Two moles of sodium diethyldithiocarbamate (chelating agent 2) coordinate with one atom of iron to form a completely chelated compound.

TABLE 1

| | Sample | | | | | | | | | | |
|---|---|---|---|---|---|---|---|---|---|---|---|
| | 1 | 2 | 3 | 4 | 5 | 6 | 7 | 8 | 9 | 10 | 11 |
| Basic formulation | | | | | | | | | | | |
| Substrate resin, HIPS parts | 100 | 100 | 100 | 100 | 100 | 100 | 100 | 100 | 100 | 100 | 100 |
| Silicone oil parts | 1.5 | 1.5 | 15 | 1.5 | 1.5 | 1.5 | 1.5 | 1.5 | 1.5 | 1.5 | 1.5 |
| Titanium oxide parts | 0.2 | 0.2 | 0.2 | 0.2 | 0.2 | 0.2 | 0.2 | 0.2 | 0.2 | 0.2 | 0.2 |
| Ca stearate parts | 0.05 | 0.05 | 0.05 | 0.05 | 0.05 | 0.05 | 0.05 | 0.05 | 0.05 | 0.05 | 0.05 |
| Additive level | | | | | | | | | | | |
| Copper chloride (copper ion) ppm | 0 | 5 | 10 | 20 | 40 | 0 | 10 | 10 | 0 | 10 | 0 |
| Iron chloride (iron ion) ppm | 0 | 0 | 0 | 0 | 0 | 20 | 0 | 0 | 20 | 0 | 20 |
| Chelating agent 1 (dithizone) ppm (equivalents) | 0 | 0 | 0 | 0 | 0 | 0 | 40 (1) | 0 | 0 | 80 (2) | 0 |
| Chelating agent 2 (Na diethyldithiocarbamate) ppm (equivalents) | 0 | 0 | 0 | 0 | 0 | 0 | 0 | 53 (1) | 91 (1.5) | 0 | 122 (2) |
| Properties | | | | | | | | | | | |
| Gas generated (acetaldehyde) relative value | 0 | 50 | 110 | 230 | 500 | 100 | 50 | 50 | 0 | 0 | 0 |
| Photographic properties (fogging) | A | B | C | D | E | C | B | B | B | A | A |

Production of Resin Molding for Photographic Light-Sensitive Material

The resin pellets produced in the examples and the comparative examples above were dried at 80° C. for 2 hours, and test piece moldings were then produced using a straight hydraulic injection molding machine having a mold clamping force of 180 tons at a resin temperature of 235° C. and a mold temperature of 20° C.

Analysis of Photographically Harmful Acetaldehyde Gas 10 g of each of the resin moldings produced in the examples and the comparative examples above was placed in a 500 ml gas collection bottle and forcibly heated at 100° C. for 8 hours. 500 ml of the gas within the bottle was drawn up by a manual pump to which was attached a DNPH cartridge (manufactured by Waters Corporation) for aldehyde analysis, and the gas was reacted. 5 ml of acetonitrile was poured into the DNPH cartridge to thereby elute a reaction product. The eluate so obtained was subjected to liquid chromatography analysis (ODS-C18 column, developing solution; acetonitrile $H_2O$=45:55), and the relative peak intensities were measured.

Method for Evaluation of Photographic Properties 10 g of each of the resin moldings produced in the examples and the comparative examples above and an ASA 400 color negative film (manufactured by Fuji Photo Film Co., Ltd.) were placed in a 700 ml stainless can and forcibly heated at 50° C. for 3 days. This film was developed, and the fogging density was measured.

The measurement results were evaluated using the 5 categories below. A and B are in a working range.

A: Excellent, no fogging observed at all.

B: Almost no fogging observed.

C: Slight fogging observed.

D: Lot of fogging.

E: Extremely severe fogging.

As is clear from Table 1, when the sum total amount of any metal present in the resin in the form of the free metal ion, an oxide thereof, and the metal, but excluding the metal chelate, was 5 ppm or less, the amount of gas generated was suppressed, and good photographic properties were obtained.

Example 2

Sample 12 To 100 parts of LD-PE (low-density polyethylene) were added 20 parts by weight of titanium oxide, 0.3 parts by weight of carbon black, and 2.5 parts by weight of oleamide. The mixture to which the additives had been added was then melt-kneaded at a resin temperature of 180° C. using a single shaft extruder whose extrusion screw had an L/D of 25, extruded into water in the form of a strand, solidified, and then cut into resin pellets having a diameter of 3 mm and a length of 3 mm by means of a pelletizer.

Samples 13 to 20 The procedure for Sample 12 was repeated except that the additives shown in Table 2 were added to give Samples 13 to 20, and moldings were produced as described below and evaluated.

The results are given in Table 2.

TABLE 2

| | Sample | | | | | | | | |
|---|---|---|---|---|---|---|---|---|---|
| | 12 | 13 | 14 | 15 | 16 | 17 | 18 | 19 | 20 |
| MB basic formulation | | | | | | | | | |
| Substrate resin, LD-PE parts | 100 | 100 | 100 | 100 | 100 | 100 | 100 | 100 | 100 |
| Titanium oxide parts | 20 | 20 | 20 | 20 | 20 | 20 | 20 | 20 | 20 |
| Carbon black #44 parts | 0.3 | 0.3 | 0.3 | 0.3 | 0.3 | 0.3 | 0.3 | 0.3 | 0.3 |
| Additive level | | | | | | | | | |
| Lubricant (oleamide) parts | 2.5 | 2.5 | 2.5 | 2.5 | 0 | 0 | 2.5 | 0 | 2.5 |
| Lubricant (oleic acid) parts | 0 | 0 | 0 | 0 | 2.5 | 0 | 0 | 2.5 | 0 |
| Lubricant (stearic acid) parts | 0 | 0 | 0 | 0 | 0 | 2.5 | 0 | 0 | 0 |
| Copper chloride (copper ion) ppm | 0 | 10 | 20 | 40 | 20 | 20 | 20 | 20 | 20 |
| Iron chloride (iron ion) ppm | 0 | 0 | 0 | 0 | 0 | 0 | 0 | 0 | 0 |
| Chelating agent 1 (dithizone) ppm (equivalents) | 0 | 0 | 0 | 0 | 0 | 0 | 160 (2) | 160 (2) | 0 |
| Chelating agent 2 (Na diethyldithiocarbamate) ppm (equivalents) | 0 | 0 | 0 | 0 | 0 | 0 | 0 | 0 | 106 (2) |
| Properties | | | | | | | | | |
| Gas generated (acetaldehyde) (relative value) | 0 | 50 | 110 | 230 | 500 | 100 | 0 | 0 | 0 |
| Photographic properties (fogging) | A | C | C | D | E | C | A | A | A |

Production of Resin Molding for Photographic Light-Sensitive Material

The pellets produced in the examples and the comparative examples above were dried at 80° C. for 2 hours, and test piece moldings were then produced using a straight hydraulic injection molding machine having a mold clamping force of 180 tons at a resin temperature of 160° C. and a mold temperature of 20° C.

Analysis of Photographically Harmful Acetaldehyde Gas 5 g of each of the resin moldings produced in the examples and the comparative examples above was placed in a 500 ml gas collection bottle and forcibly heated at 80° C. for 2 days, and the gas within the bottle was then drawn up and made to generate a color using a 92L acetaldehyde gas detector tube (manufactured by Gastec Corporation). The relative color density was measured.

Method for Evaluation of Photographic Properties

After the resin moldings produced in the examples and the comparative examples above were forcibly heated at 80° C. for 2 days, 5 g of each thereof and an ASA 400 color negative film (manufactured by Fuji Photo Film Co., Ltd.) were placed in a 700 ml stainless can and forcibly heated at 50° C. for 3 days. This film was developed, the fogging density was measured, and the measurement results were evaluated using the 5 categories below. A and B are in a working range.

A: Excellent, no fogging observed at all.

B: Almost no fogging observed.

C: Slight fogging observed.

D: Lot of fogging.

E: Extremely severe fogging.

The resin of Sample 7 of Example 1 was used as a green (phthalocyanine pigment) shutter lever for a film-with-lens, and the effects of the present invention were exhibited.

Furthermore, when an LDPE blown film packaging material was formed using an oleamide lubricant and a colcothar ($Fe_2O_3$) colorant, the effects of the present invention were exhibited.

What is claimed is:

1. A packaging material for a photographic light-sensitive material, the packaging material comprising:

a resin composition that contains a compound having an unsaturated double bond or that contains a poly (conjugated diene) component, a metal ion that can promote a catalytic oxidation reaction of the unsaturated double bond or the poly(conjugated diene), and a chelating agent that can coordinate the metal ion, the chelating agent being present in an amount sufficient to suppress the catalytic oxidation reaction;

wherein the chelating agent is dithizone, sodium diethyldithiocarbamate or N,N-diphenyloxamide.

2. The packaging material for a photographic light-sensitive material according to claim 1 wherein the amount added of the chelating agent for the metal ion that can promote a catalytic oxidation reaction is ½ to 3 equivalents relative to the metal ion content.

3. A photographic light-sensitive material package formed by housing a photographic light-sensitive material in a packaging material for a photographic light-sensitive material, the packaging material comprising a resin composition that contains a compound having an unsaturated double bond or that contains a poly(conjugated diene) component, a metal ion that can promote a catalytic oxidation reaction of the unsaturated double bond or the poly (conjugated diene), and a chelating agent that can coordinate the metal ion, the chelating agent being present in an amount sufficient to suppress the catalytic oxidation reaction.

4. The photographic light-sensitive material package according to claim 3 wherein the compound having an unsaturated double bond is an unsaturated organic acid, an unsaturated aliphatic compound, an unsaturated alcohol, an amide derivative thereof, an ester derivative thereof, or an ether derivative thereof.

5. The photographic light-sensitive material package according to claim 3 wherein the resin composition that contains the poly (conjugated diene) component is a resin formed by copolymerizing an aliphatic conjugated diene monomer and a monomer that can copolymerize therewith.

6. The photographic light-sensitive material package according to claim 5 wherein the aliphatic conjugated diene monomer is 1,3-butadiene, isoprene, 2,3-dimethyl-1,3-butadiene, 2-ethyl-1,3-butadiene, 1,3-pentadiene, or chloroprene.

7. The photographic light-sensitive material package according to claim 3 wherein the metal ion that can promote the catalytic oxidation reaction is a metal ion of Co, Cu, Fe, V, Cd, Al, Mg, Ni, Ti, Ca, Zn, Ag, Ga, Ge, As, Se, Mn, Cr, Sc, In, Sn, Sb, or Te.

8. The photographic light-sensitive material package according to claim 7 wherein the metal ion is a metal ion of Co, Cu, or Fe.

9. The photographic light-sensitive material package according to claim 3 wherein the amount added of the chelating agent for the metal ion that can promote a catalytic oxidation reaction is ½ to 3 equivalents relative to the metal ion content.

10. The photographic light-sensitive material package according to claim 3 wherein the chelating agent for the metal ion that can promote a catalytic oxidation reaction is added in an amount sufficient to completely coordinate with the metal ion.

11. The photographic light-sensitive material package according to claim 9 wherein the amount of the chelating agent added is 1 to 2 equivalents relative to the metal ion content.

12. The photographic light-sensitive material package according to claim 3 wherein the chelating agent is dithizone, sodium diethyldithiocarbamate, or N,N-diphenyloxamide.

13. The packaging material for a photographic light-sensitive material according to claim 1, wherein the compound having an unsaturated double bond is an unsaturated organic acid, an unsaturated aliphatic compound, an unsaturated alcohol, an amide derivative thereof, an ester derivative thereof or an ether derivative thereof.

14. The packaging material for a photographic light-sensitive material according to claim 1, wherein the resin composition that contains the poly (conjugated diene) component is a resin formed by copolymerizing an aliphatic conjugated diene monomer and a monomer that can copolymerize therewith.

15. The packaging material for a photographic light-sensitive material according to claim 14, wherein the aliphatic conjugated diene monomer is 1,3-butadiene, isoprene, 2,3-dimethyl-1,3-butadiene, 2-ethyl-1,3-butadiene, 1,3-pentadiene or chloroprene.

16. The packaging material for a photographic light-sensitive material according to claim 1, wherein the metal ion that can promote the catalytic oxidation reaction is a metal ion of Co, Cu, Fe, V, Cd, Al, Mg, Ni, Ti, Ca, Zn, Ag, Ga, Ge, As, Se, Mn, Cr, Sc, In, Sn, Sb or Te.

17. The packaging material for a photographic light-sensitive material according to claim 16, wherein the metal ion is Co, Cu or Fe.

18. The packaging material for a photographic light-sensitive material according to claim 1, wherein the chelating agent for the metal ion that can promote a catalytic oxidation reaction is added in an amount sufficient to completely coordinate with the metal ion.

19. The packaging material for a photographic light-sensitive material according to claim 18, wherein the amount of chelating agent added is 1 to 2 equivalents relative to the metal ion content.

20. The packaging material for a photographic light-sensitive material according to claim 1, wherein the amount of chelating agent added is from 40 to 122 ppm.

21. The photographic light-sensitive material package according to claim 3, wherein the amount of the chelating agent added is from 40 to 122 ppm.

* * * * *